Aug. 10, 1943.    R. J. MILLER    2,326,666
FLUID DRIVE
Filed Dec. 15, 1941
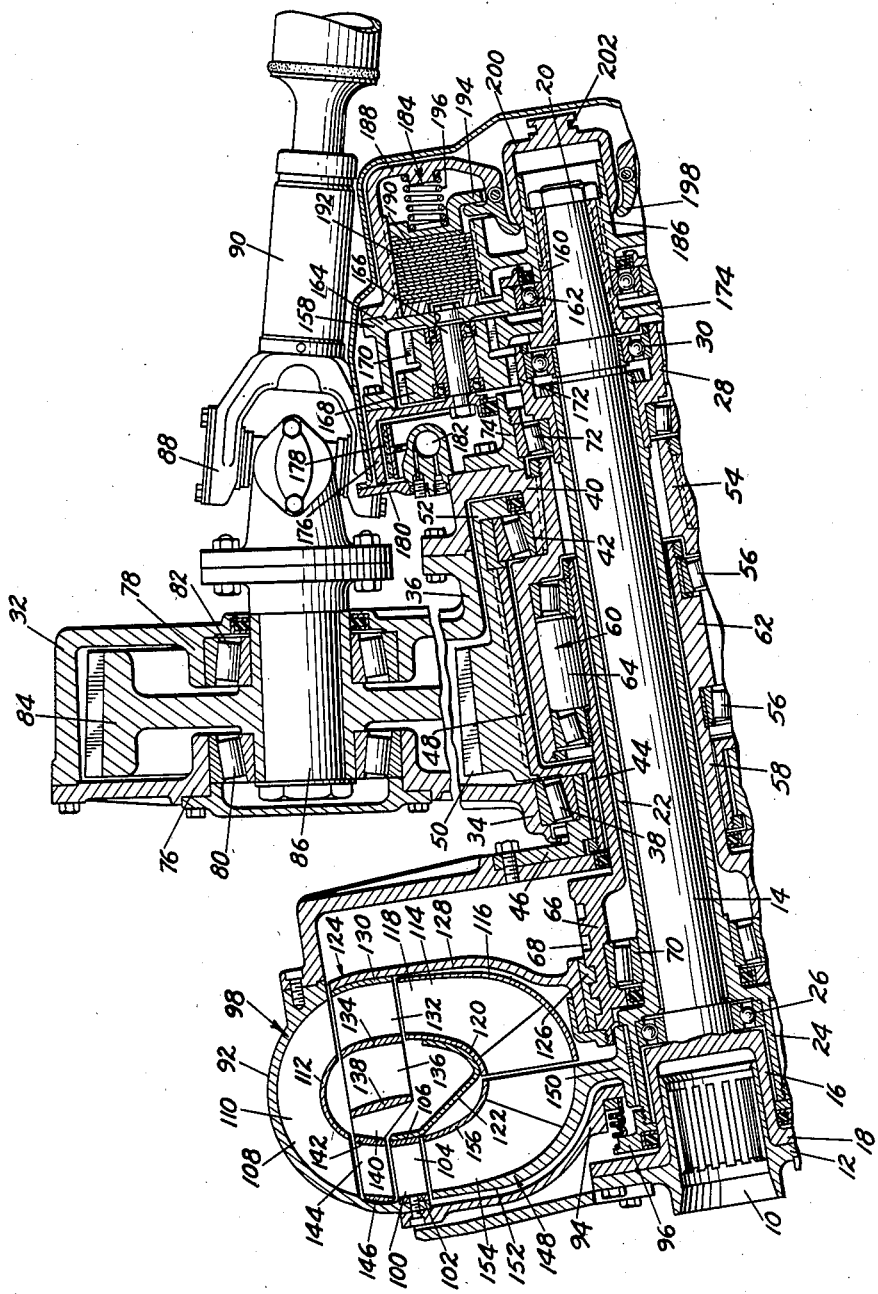
INVENTOR
RAYMOND J. MILLER
BY C. H. Fowler
ATTORNEY Patented Aug. 10, 1943

2,326,666

UNITED STATES PATENT OFFICE 2,326,666

FLUID DRIVE

Raymond J. Miller, Detroit, Mich., assignor to Hydraulic Brake Company, Detroit, Mich., a corporation of California Application December 15, 1941, Serial No. 423,103

8 Claims. (Cl. 74—189.5)

This invention relates to fluid drives, and more particularly to that type generally known as torque converters.

Broadly the invention comprehends a fluid drive for heavy duty vehicles including an impeller, a turbine driven thereby, and means operative for driving the impeller at different peaks of efficiency.

An object of the invention is to provide a fluid drive including cooperating driving and driven members, operative at two cycles.

Another object of the invention is to provide a fluid drive for heavy duty vehicles including a fluid power transmission, a two-speed mechanical transmission for transmitting power to the fluid transmission, and means for delivery of power directly from the fluid transmission.

A further object of the invention is to provide a fluid drive for heavy duty vehicles including a torque converter comprising an impeller, a turbine providing in conjunction therewith a fluid circuit, a reaction member movable into and out of the circuit, and a support for the reaction member mounted for free rotation in one direction only.

Still a further object of the invention is to provide a fluid drive including a fluid transmission, a two-speed mechanical transmission arranged in spaced relation to the fluid transmission, force-multiplying means mounted between the fluid and mechanical transmissions and operatively connected to one element of the fluid transmission, and means for control of the mechanical transmission.

Other objects and advantages of the invention will appear from the following description taken in connection with the drawing forming a part of this specification, and in which, The single figure is a schematic view, mostly in section, of a fluid drive embodying the invention.

Referring to the drawing for more specific details of the invention, 10 represents a sleeve having a circumferential flange 12. This sleeve is suitable for the reception of the crank shaft of an internal combustion engine or any other desirable type of power plant.

A driving shaft 14 has an enlarged end 16 provided with a socket and a radial flange 18. The socket receives the sleeve 10, and the flange 18 is suitably secured to the flange 12, and the other end of the shaft is tapered as indicated at 20.

A sleeve 22 is supported for rotation on the shaft 14. As shown, the sleeve 22 has a hub 24 on one end thereof for the reception of a bearing 26 fitted on the shaft 14. The hub also receives the enlarged end 16 of the shaft 14 with substantial clearance, and a detachable hub 28 suitably secured to the other end of the sleeve 22 receives a bearing 30 also fitted on the shaft 14.

A stationary housing 32 has hubs 34 and 36. The hub 34 has fitted therein a bearing 38, and the hub 36 has detachably secured thereto a bearing support 40 for the reception of a bearing 42. A sleeve 44 has splined thereto a hub 46 supported by the bearing 38, and the sleeve also has an enlarged body portion 48, and splined to this body portion is a pinion 50 having a concentrically displaced sleeve 52 receiving the bearing 42.

A sleeve 54 splined to the bearing support 40 and suitably secured against displacement is extended into the enlarged body 48 of the sleeve 44, and fitted in the sleeve 54 are spaced bearings 56. A sleeve 58 supported for rotation on the bearings 56 has thereon a brake 60 including a brake face 62 on the sleeve 58 between the bearings 56 and rollers 64 for cooperation with the face 62 and the wall of the sleeve 54.

The sleeve 58 has a concentrically disposed enlarged portion 66 provided with external threads 68, and fitted in the enlarged portion 66 is a bearing 70 in axial alignment with a bearing 72 fitted in a bearing support 74 suitably secured to the bearing support 40, and the bearings 70 and 72 receive the sleeve 22.

The housing 32 has oppositely disposed bearing supports 76 and 78 offset from the bearing supports 34 and 36, and bearings 80 and 82 fitted on the bearing supports receive for rotation a large gear 84 in mesh with the pinion 50. The gear 84 receives a stub shaft 86, and bolted or otherwise secured to this stub shaft is one member of a universal joint 88 having its other member suitably connected to a driven shaft 90.

A rotatable housing 92, bolted or otherwise secured to the hub 46 splined on the sleeve 44, has a hub 94 receiving the hub 24 on the sleeve 22 with substantial clearance. A ring 96 threaded on the hub 24 has thereon a fluid seal embracing the driving shaft, and interposed between the ring 96 and the hub 94 is a fluid seal for inhibiting seepage of fluid from the housing.

The housing 92 has therein a three-stage turbine indicated generally at 98. The first stage 100 of the turbine includes an outer shroud 102 secured to the wall of the housing and a plurality of vanes 104 arranged thereon supporting an inner shroud 106. The second stage 108 of the turbine includes a plurality of blades 110 secured to the wall of the housing 92 and supporting an inner shroud 112, and the third stage 114 of the turbine includes an outer shroud 116 having arranged thereon a plurality of blades 118 supporting an inner shroud 120 secured by a suitable ring or bracket 122 to the inner shroud 106 of the first stage.

A reaction member indicated generally at 124 includes a carrier 126 mounted for travel on the threads 68 of the enlarged portion 66 of the sleeve 58. The carrier 126 has suitably secured thereto a web 128 supporting an outer shroud 130 having arranged thereon a plurality of reaction vanes 132 movable into and out of the fluid circuit between the second and third stages of the turbine. The reaction vanes 132 have thereon an inner shroud 134, and arranged on this shroud is a plurality of guide vanes 136 supporting a shroud 138. When the reaction vanes move into the fluid circuit, the guide vanes move out of the fluid circuit, and vice versa. The shroud 138 is connected by a ring or bracket 140 to an inner shroud 142 having thereon a plurality of reaction vanes 144 supporting an outer shroud 146. The reaction vanes 144 move into and out of the fluid circuit between the first and second stages of the turbine, and the movement thereof is in unison with that of the reaction vanes 132. The operation and function of the reaction member 124 will hereinafter appear.

An impeller, indicated generally at 148, is mounted on the enlarged portion 24 of the sleeve 22 within the housing 92 in oppositely disposed relation to the turbine, and provides in conjunction therewith a vortex chamber for circulation of fluid. The impeller includes a hub 150 keyed to the sleeve 22, and the hub supports an outer shroud 152 having arranged thereon a plurality of blades 154 supporting an inner shroud 156.

A planetary gear system indicated generally at 158 connects the driving shaft 14 to the impeller 148. As shown, a sleeve 160 splined to the tapered end 20 of the driving shaft has fitted thereon a bearing 162, and a housing 164 mounted for rotation on the bearing has therein a transversely disposed shaft 166. A planet pinion 168 and a relatively small planet pinion 170 are journaled on the shaft 166. The large planet pinion 168 meshes with a sun gear 172 on the hub 28 of the sleeve 22, and the small planet pinion 170 meshes with a sun gear 174 secured to the sleeve 160.

A brake drum 176 is suitably secured to the housing 164, and friction elements 178 for cooperation with the drum are suitably mounted on a fixed support 180, and a fluid pressure actuated motor 182 is operative to actuate the friction elements into engagement with the drum.

A disc clutch, indicated generally at 184, is connected between the driving shaft 14 and the rotatable housing 164 of the planetary gear system. As shown, the clutch includes a member 186 splined to the sleeve 160 on the tapered end of the driving shaft, a bonnet 188 fixedly secured to the rotatable housing 164 of the planetary gear system, and a stack of interleafing friction elements 190 and 192 carried respectively by the member 186 and the bonnet 188.

A slidable compression ring 194 is urged by springs 196 to abut the friction elements. A plurality of spaced levers 198 fulcrumed on the bonnet engage the compression ring, and a slidable cap 200 for cooperation with the levers has a groove 202 for the reception of a shifting fork, not shown. The clutch is normally engaged, and may be released by shifting the cap 200 so as to actuate the levers 198 and compress the springs 196 through the medium of the compression ring.

In a normal operation, upon rotation of the shaft 14, force is transmitted through the clutch 184 and the mechanical transmission 158, operating as a single unit, to the sun gear 172, resulting in driving the sleeve 22 and consequently the impeller 148, thus effecting a direct drive.

Rotation of the impeller 148 results in energization of the fluid in the vortex chamber. The energy of the fluid is absorbed by the vanes of the first, second, and third stages 100, 108 and 114 of the turbine. This results in rotation of the turbine and the consequent transmission of power therefrom through the pinion 50 carried by the turbine and the gear 84 in mesh therewith, to the stub shaft 86 connected by the universal joint 88 to the driven shaft 90.

At a predetermined speed of operation wherein torque multiplication is no longer required, the direction of flow of the fluid in the vortex chamber changes, and the fluid impinges on the backs of vanes 144 and 132 of the reaction member 124. This results in movement of the reaction member 124 on the threads 68 of the sleeve 58, and this movement of the reaction member results in retraction of the reaction vanes 144 and 132 from the fluid circuit and movement of the guide vanes 136 into the circuit between the second and third stages 108 and 114 of the turbine. When the reaction vanes are fully retracted, the reaction member 124 rotates with the sleeve 58 as a unit. This completes the cycle of operation for a direct drive.

When it is desired to effect an overdrive, the clutch 184 is released and the brake 176 is applied to hold the housing 164 against movement. This results in the transmission of force through the sun gear 174, and pinions 168 and 170, and sun gear 172 to the sleeve 22, resulting in increase of speed of the impeller.

This increase in speed of the impeller is greater than that of the turbine, and this differential in speed results in a change in the direction of fluid flow, causing the reaction vanes 144 and 132 to move into the fluid circuit to again provide for torque multiplication. When the reaction vanes move into the fluid circuit, the reaction member 124 travels on the threads 68 on the sleeve 58 held against movement in one direction by the brake 60, and when torque multiplication is again no longer required, the direction of flow of the fluid again changes and the fluid impinges on the backs of the vanes 144 and 132, causing the reaction vanes to again move out of the fluid circuit and the guide vanes 136 to move into the fluid circuit, whereupon the reaction member and the sleeve 22 are free to rotate as a unit. This completes the cycle of operation for an overdrive.

It is obvious that an underdrive may be effected by a suitable change of gears in the planetary system, and it is also obvious that in any change in speed, due to deceleration or an increased torque demand, the unit functions in the proper cycle to produce the most efficient operation.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure as Letters Patent is:

1. A power transmission comprising a mechanical transmission, a fluid transmission driven thereby, a clutch for the mechanical transmission providing for one speed of operation of the fluid transmission, a brake for the mechanical transmission providing for another speed of operation of the fluid transmission, a torque-multiplying means mounted between the transmission and operatively connected to the fluid transmission, and a shaft connected to the torque-multiplying means.

2. A power transmission comprising a drive shaft, a sleeve supported thereon for relative rotation, a two-speed mechanical transmission connecting the shaft and the sleeve, a fluid transmission connected to the sleeve, a torque-multiplying means mounted on the sleeve between the transmissions and connected to the driven element of the fluid transmission, a driven shaft connected to the torque-multiplying means, and means for control of the mechanical transmission providing for two speeds of operation of the fluid transmission.

3. A power transmission comprising a drive shaft, a sleeve mounted thereon for relative rotation, a gear system connecting the shaft and the sleeve, a fluid transmission connected to the sleeve, a clutch controlling the gear system for one phase of operation of the fluid transmission, a brake controlling the gear system for another phase of operation of the fluid transmission, a torque-multiplying means mounted between the transmissions and connected to the fluid transmission, and a shaft connected to the torque multiplying means.

4. A power transmission comprising a fluid transmission including an impeller, a turbine providing in conjunction therewith a fluid circuit, and a reaction member automatically movable into and out of the circuit to vary torque multiplication as operating conditions may require, and a gear system connected to the impeller of the fluid transmission having manually operated controls for effectively driving the fluid transmission through two speed cycles of operation repeated successively.

5. A power transmission comprising a fluid transmission including an impeller, a turbine providing in conjunction therewith a fluid circuit and a reaction member movable into and out of the fluid circuit to vary torque multiplication as operating conditions may require, means for operating the fluid transmission through two speed cycles repeated successively including independent brake and clutch means, and torque-multiplying means operatively connected to the fluid transmission.

6. A power transmission comprising a fluid transmission including an impeller, a turbine providing in conjunction therewith a fluid circuit, and a reaction member movable into and out of the circuit to vary torque multiplication as operating conditions may require, a mechanical transmission for operating the fluid transmission through two speed cycles repeated successively, said mechanical transmission controlled by independent clutch and brake means, a torque-multiplying means operatively connected to the fluid transmission, and means driven by the torque-multiplying means.

7. A power transmission comprising a fluid transmission including an impeller, a turbine providing in conjunction therewith a fluid circuit, a reaction member movable into and out of the circuit to vary torque multiplication as operating conditions may require, a mechanical transmission connected to the fluid transmission, control means for the mechanical transmission to drive the fluid transmission through two speeds of operation repeated successively, a torque-multiplying means mounted between the fluid and mechanical transmissions and operatively connected to the turbine, and means driven by the torque-multiplying means.

8. A power transmission comprising a driving shaft, a sleeve supported thereon for relative rotation, a mechanical transmission connecting the shaft and the sleeve, a fluid transmission on the sleeve including an impeller and a turbine providing in conjunction with one another a fluid circuit, a reaction member movable into and out of the fluid circuit to vary torque multiplication as operating conditions may require, means for controlling the mechanical transmission so as to drive the fluid transmission through two speeds of operation repeated in succession, a torque-multiplying means mounted between the transmissions and operatively connected to the turbine of the fluid transmission, and means driven by the torque-multiplying means.

RAYMOND J. MILLER.